(12) United States Patent
Bushnell et al.

(10) Patent No.: US 7,159,398 B1
(45) Date of Patent: Jan. 9, 2007

(54) CONCENTRIC TUBE SHAPE MEMORY ALLOY ACTUATOR APPARATUS AND METHOD

(75) Inventors: Glenn S Bushnell, Puyallup, WA (US); Ted D Whitley, Lopez Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/294,718

(22) Filed: Dec. 6, 2005

(51) Int. Cl.
  *F01B 29/10* (2006.01)
(52) U.S. Cl. ............................... 60/529; 60/528
(58) Field of Classification Search ............... 60/527, 60/528, 529
  See application file for complete search history.

(56) References Cited

U.S. PATENT DOCUMENTS

| | | | | |
|---|---|---|---|---|
| 5,127,228 A | * | 7/1992 | Swenson ................. | 60/527 |
| 6,065,934 A | * | 5/2000 | Jacot et al. ............. | 416/155 |
| 6,326,707 B1 | * | 12/2001 | Gummin et al. ........ | 310/12 |
| 6,453,536 B1 | * | 9/2002 | Muller et al. ........... | 29/423 |
| 6,499,952 B1 | * | 12/2002 | Jacot et al. ............. | 416/155 |

* cited by examiner

*Primary Examiner*—Hoang Nguyen
(74) *Attorney, Agent, or Firm*—Harness Dickey & Pierce P.L.C.

(57) ABSTRACT

A rotary SMA actuator includes an SMA assembly having a plurality of grooves formed therein to form a plurality of concentrically arranged SMA tubes. A heater element is disposed against an input end of the SMA tubes and generates heat when electrical current is applied thereto. The heat is used to heat the SMA tubes, which causes an angular deflection of each of the tubes at an output end thereof. An innermost one of the SMA tubes is used as an output member and its angular deflection is the sum of the angular deflections of all of the SMA tubes. The actuator is of a smaller size and lighter weight than electrical, mechanical, hydraulic or pneumatic actuators of comparable torque output. The actuator also provides greater deflection capability than similarly sized SMA type actuators that do not employ concentric tubes.

17 Claims, 3 Drawing Sheets

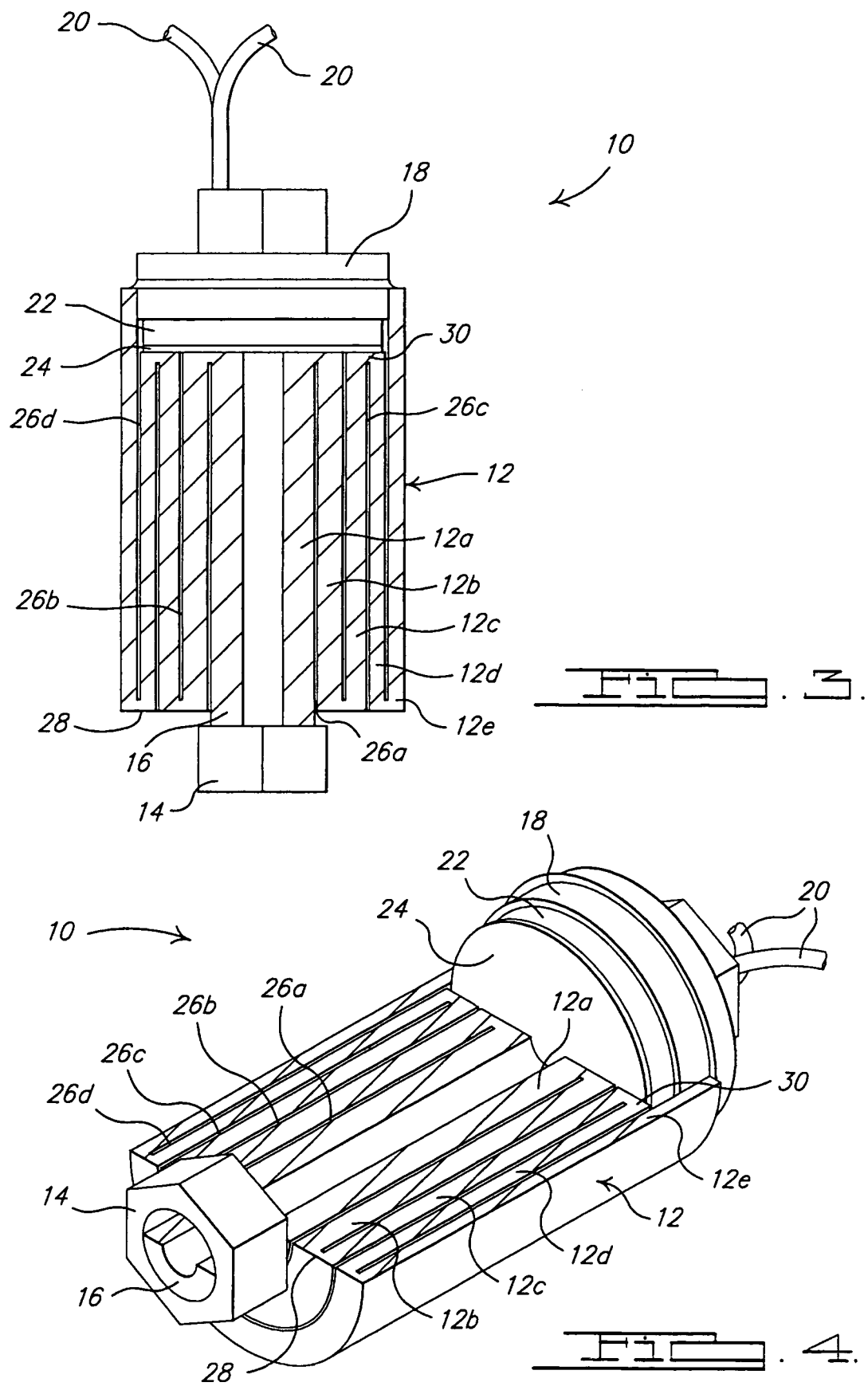

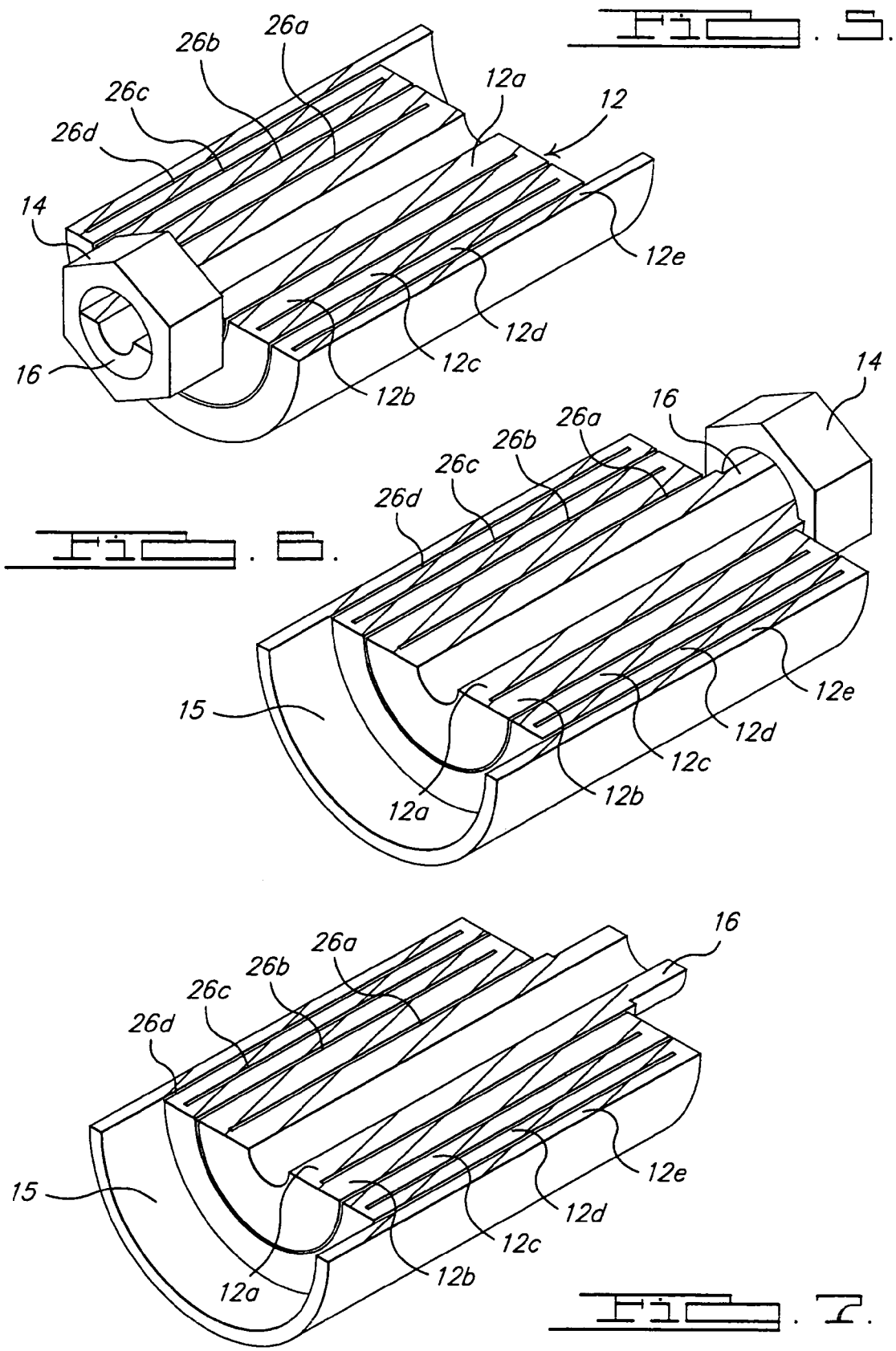

CONCENTRIC TUBE SHAPE MEMORY ALLOY ACTUATOR APPARATUS AND METHOD

FIELD OF THE INVENTION

The present invention relates to actuators, and more particularly to an actuator employing a plurality of shape memory alloy (SMA) tubes or cylinders concentrically arranged relative to one another to provide a compact sized and light weight device as compared with similarly mechanical, electrical, hydraulic or pneumatic actuators of comparable torque output, and able to provide relatively high angular deflection as compared with similarly sized SMA type actuators.

BACKGROUND OF THE INVENTION

Actuators are used in a wide variety of commercial applications. Examples are opening and closing doors, raising and lowering loading ramps, positioning of aerodynamic edge flaps and tabs, and morphing structures, which are mechanisms on spacecraft or aircraft for actuating surfaces and other structural elements. Examples of doors are bay doors, instrument covers, and access panels. Typically, such actuators have to be relatively rugged to withstand use in thermally harsh environments, such as may be experienced in many commercial aircraft and spacecraft applications.

While present day electromechanical and mechanical actuators serve a useful purpose, it would nevertheless be desirable to provide an actuator which is capable of producing large torque and large deflection output in a much smaller, lighter, and more rugged package. SMA actuators have been developed that provide high torque capability, but their deflection range is limited . . . Such small and light weight actuators capable of providing high torque and even greater degrees of angular deflection would find significant utility in a wide variety of applications. Such applications would involve airborne and space based mobile platforms such as aircraft and spacecraft, where large, deployable surfaces are expected to be employed or controlled. Providing an actuator that is capable of producing a larger degree of angular deflection and/or torque at its output member, for a given weight and size, would also be highly beneficial in many applications where limiting weight and size are highly important design considerations. Such applications, again, are often found with airborne and space based mobile platforms, where reducing the weight of the aircraft or spacecraft is of paramount importance to designers. Providing an actuator that can achieve greater angular deflections and/or torques, but which is smaller and lighter in weight than presently available actuators offering similar performance characteristics, would be highly valuable to designers of various systems and/or platforms that employ actuators.

SUMMARY OF THE INVENTION

The present invention is directed to a rotary actuator apparatus and method that employs a plurality of shape memory alloy (SMA) tubes to achieve even greater angular deflection than comparatively sized SMA actuators. The actuator of the present invention typically comprises even fewer individual component parts than previously developed electrical, mechanical, pneumatic or hydraulic actuators.

In one preferred embodiment, an actuator is provided that has a plurality of concentrically arranged SMA tubes. The tubes are in thermal contact with a heater module that is able to controllably apply heat to the SMA tubes. Applying heat causes an angular deflection of each SMA concentric tube, and the angular deflection of each tube is effectively summed to produce a total angular deflection between the input and output ends of the actuator. The concentric tubes behave similarly to the same number of tubes attached in series to form a single, longer tube. The torque provided between the input and output ends of the SMA actuator is the torque provided by any one of the SMA tubes of the actuator. The maximum torque output is related to the inside and outside diameters of the tubes, thus the maximum torque output of any single embodiment can be increased using diametrically larger or thicker walled tubes. The angular deflection can be increased by increasing the number of concentric tubes used in the actuator.

In one preferred form the SMA tubes are all formed from a single piece of SMA material by removing concentric, circular portions of material to produce a plurality of concentrically arranged SMA portions resembling individual tubes. In one preferred embodiment, a layer of thermal conduction material is placed along an input end of the SMA material to simultaneously heat each of the SMA tubes formed from the single piece of SMA material.

Further areas of applicability of the present invention will become apparent from the detailed description provided hereinafter. It should be understood that the detailed description and specific examples, while indicating various preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a side cross sectional view of the actuator taken in accordance with section line 3—3 in FIG. 1;

FIG. 4 is a perspective view of the assembly shown in FIG. 3;

FIG. 5 is a perspective view of just the SMA assembly of FIG. 4 together with an output shaft nut;

FIG. 6 is a view of the SMA assembly of FIG. 5 but from a rear perspective; and FIG. 7 is a perspective view of just the SMA material shown in FIGS. 3–6.

DETAILED DESCRIPTION OF THE PREFERRED EMBODIMENTS

The following description of the preferred embodiment(s) is merely exemplary in nature and is in no way intended to limit the invention, its application, or uses.

Figure 1:
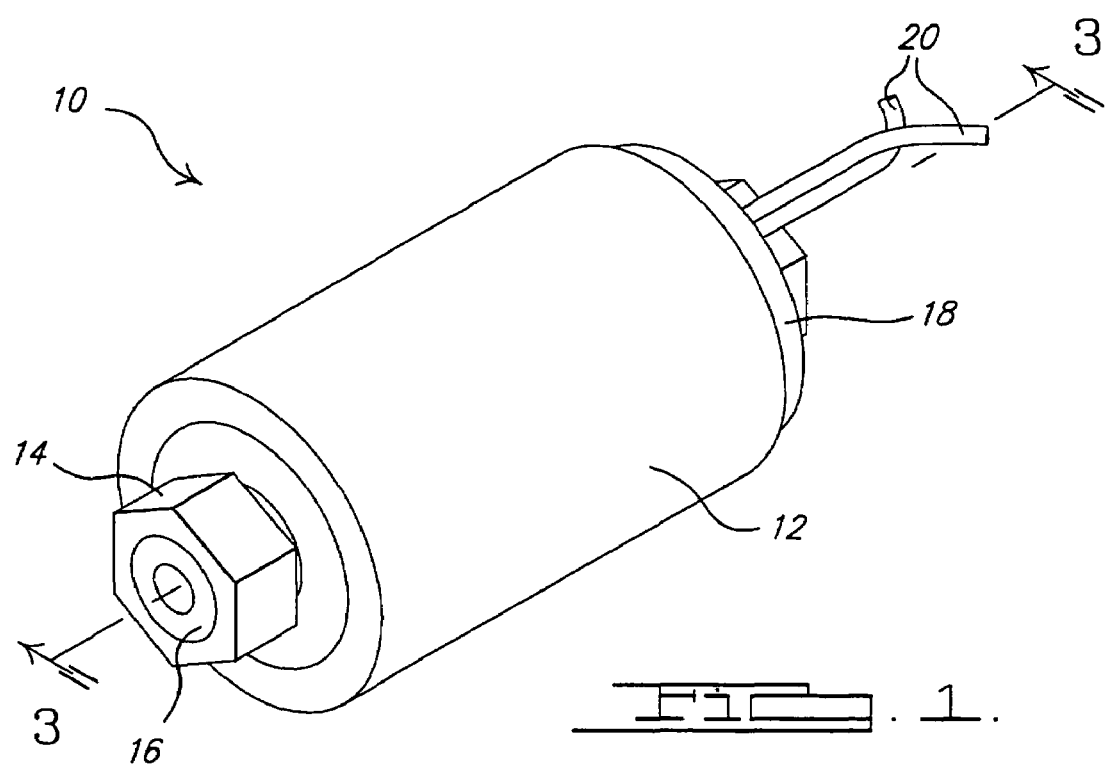
FIG. 1 is a perspective view of a rotary SMA actuator in accordance with a preferred embodiment of the present invention.
Figure 2:
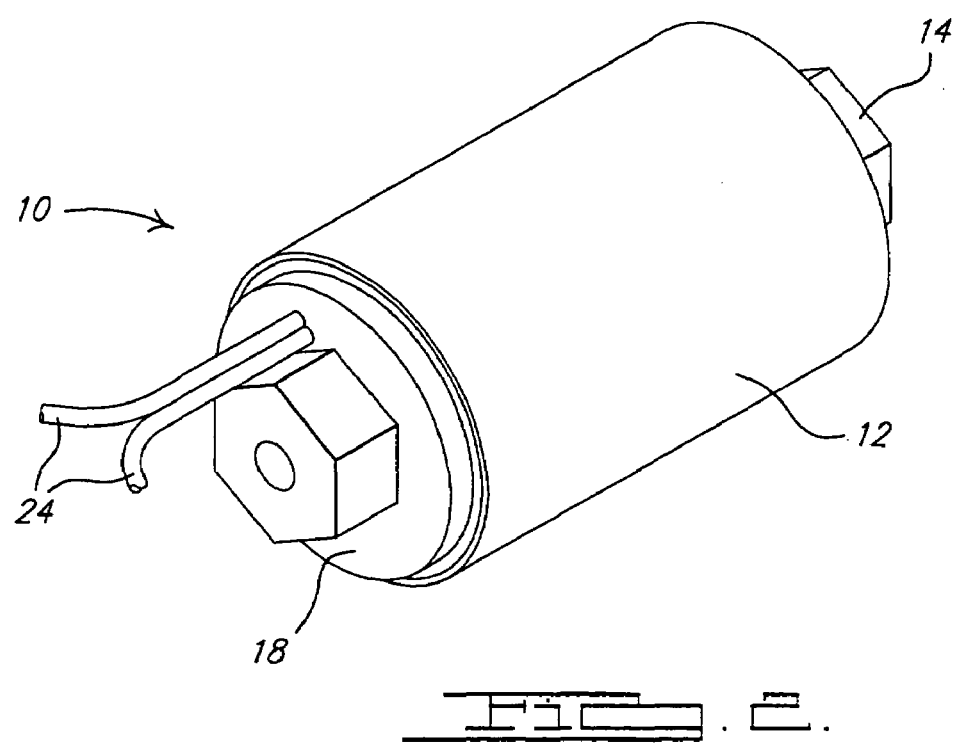
FIG. 2 is a rear perspective view of the actuator of FIG. 1.

Referring to FIGS. 1 and 2, a rotary SMA (shape memory alloy) actuator 10 is shown in accordance with a preferred embodiment of the present invention. The SMA actuator 10 includes a single piece of SMA material that forms an SMA assembly 12. The SMA assembly 12 has a plurality of internally, concentrically arranged SMA tubes, an output shaft nut 14 that is attached to an output shaft 16 of the SMA assembly 12, and an end assembly 18 for enclosing a heater element (not visible). Conductors 20 lead to the heater element to supply heat to the SMA assembly 12.

Referring to FIG. 3, the SMA actuator 10 can be seen to include the SMA assembly 12 in communication with a heater component or element 22. Heater element 22 is supplied with electric current via the conductors 20 and used to heat the SMA assembly 12. End assembly 18 is used to secure and hold the heater element 22 in place in the SMA assembly 12. Preferably, a layer of thermally-conductive material 24 may be disposed between a surface of the heater element 22 and the SMA material 12 to improve thermal conduction to the SMA assembly 12.

In one preferred form, the heater element 22 consists of resistive wire on a flexible film or in a solid module. Insulated nichrome ribbon is also suitable for use as the heater element. Additional suitable flexible-tape type heater elements are also commercially available from Minco Corp. of Minneapolis, Minn. The thermally-conductive material 24, in one preferred form, comprises a carbon velvet material having a plurality of vertically-arranged, high-conductivity carbon fibers. One specific material which is suitable for use is VEL-THERM® compliant thermal interface material commercially available from Energy Sciences Laboratories, Inc. of San Diego, Calif. Other various embodiments of the application of the heater element 22 are possible. Examples are placing flexible heater elements in the grooves between the concentric tubes, wrapping a flexible heater around the outermost SMA tube, and insertion of a cartridge heater down an optional hollow center bore of the actuator 10. Such a cartridge heater is commercially available from Omega Engineering, Inc. of Stamford, Conn.

Referring to FIGS. 3–7, and particularly to FIGS. 3, 4 and 6, the SMA assembly 12 of the actuator 10 can be seen in greater detail. The SMA assembly 12, in this embodiment, comprises a single piece of SMA material having a plurality of grooves formed therein to form a plurality of concentric SMA "tubes" 12a–12e. The grooves in the SMA material 12 are formed in the material from both ends of the material as indicated in FIG. 3. For example, with reference to FIG. 3, SMA tube 12a is formed by removing material to form groove 26a from an output end 28 of the SMA material 12. Tube 12b, however, is formed by removing material to produce groove 26b from an input end 30 of the SMA assembly 12. This machining process is repeated alternately from the ends 28 and 30 of the SMA material 12. The SMA material 12, by itself, is illustrated in FIG. 7. A recessed area 15 (FIGS. 6 and 7) is formed in the SMA assembly 12 for accommodating the heater element 22 and thermally-conductive material 24. The grooves 26a, 26b, as well as the remaining grooves 26c and 26d may be formed by a conventional EDM (electrostatic discharge machining) or waterjet machining process, or any other suitable process that is able to form concentrically arranged grooves in a block of SMA material.

The SMA assembly 12 may be secured to the end assembly 18 by welding or deposition of a similar material, insertion of radial pins or fasteners, or by using a suitable epoxy adhesive. It is also possible to modify the SMA assembly 12 interface to the end assembly 18 to allow for increased loading. This is usually preferred if an epoxy is used. One example on how this can be done is to add square shaped mating teeth to both parts. End assembly 18 may be formed from the same SMA material or a similar material, or a metal or any other suitable material that when attached is sufficiently strong to sustain the load. Also, while the innermost SMA tube 12a has been shown as having a hollow cylindrical bore, it will be appreciated that a solid cylindrical SMA member could be employed just as well.

Additionally, while the SMA assembly 12 has been illustrated as a plurality of round, concentric tubes 12a–12e, a plurality of square-shaped tubes, triangular tubes or virtually any other shape of tubes could be employed besides circular tubes, as long as they allow for the necessary relative rotation between the tubes. Furthermore, while the SMA assembly 12 has been shown as being formed from a single piece of SMA material, it will be appreciated that independent SMA tubes could just as readily be employed. Such an embodiment would necessitate supporting the opposite ends of the independent SMA tubes so that the tubes are held in a concentric arrangement.

While the output shaft nut 14 is shown being attached to the innermost SMA tube 12a, it will be appreciated that the nut 14 merely illustrates one means of enabling coupling to the innermost SMA tube 12a. Attachments can also be made using pins, fasteners, standard keys and keyways, or by any other interference methods. A socket interface can also be used. In this case a nut may be permanently attached to the innermost SMA tube 12a and torque can be applied using a socket interface. The nut can be attached using any of the above methods or by welding or deposition if the nut is made of a similar material as the SMA tube.

In operation, when heat is applied by the heater element 22, the thermally-conductive material 24 heats the input end 30 of the SMA assembly 12. As each of the SMA tubes 12a–12e simultaneously heats up along its full length, each tube deflects (i.e., twists) angularly between its ends. The rate of angular deflection can be controlled by the application of heat from the heater element 22 by controlling the current and/or voltage signal applied to the heater element. The total deflection of the innermost SMA tube 12a, as seen at the output shaft 16, is the sum of the angular deflections of tubes 12a–12e. Thus, the actuator 10 provides greater angular deflection than previously developed single tube SMA actuators of comparable size and weight. Similarly, the torque produced at the output shaft 16 of innermost SMA tube 12a is the torque applied through each of the SMA tubes 12a–12e. Thus, the actuator 10 provides the same torque as in an equivalent length single SMA tube actuator consisting of any one of the concentric tubes, but has greater deflection capacity for the given length by utilization of multiple concentric tubes. The actuator 10 retains all of the torque advantages of a SMA tube actuator and thus has greater torque than previously developed electrical, mechanical, hydraulic or pneumatic actuators of comparable size and weight. The angular deflection and torque output is dependent on the actuator size. For example, a two inch long, half inch diameter single tube actuator can rotate ten degrees against a sustained load of three hundred inch pounds, while a two inch long, one inch diameter six concentric tube actuator can rotate forty-five degrees while working against the same load. The weight and size of the actuator 10 is typically between 5 to 50 times lighter and smaller than a comparable electrical, mechanical, hydraulic or pneumatic actuator of equivalent torque output.

The present invention thus provides an actuator and method which is able to produce greater angular deflections and greater torques than comparably sized, present day actuators. The actuator 10 is compact, lightweight, and constructed of relatively few components parts. It is anticipated that the various preferred embodiments described herein will find utility in a wide variety of applications, and particularly in commercial aircraft and aerospace applications where robust, compact, lightweight actuators are desired for controlling various mechanisms and control surfaces.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An actuator comprising:
    a single block of shape memory alloy (SMA) material having concentric, circumferential grooves forming a plurality of interconnected, concentrically arranged and supported SMA members;
    a heating component in thermal communication with SMA members for controllably heating said SMA members; and
    said heating causing a twisting of said SMA members at one end of each of said SMA members that generates a twisting force and a collective twisting displacement at said one end.

2. The actuator of claim 1, wherein said SMA members are each supported at a first end thereof by an end assembly.

3. The actuator of claim 1, wherein said SMA members comprise SMA tubes.

4. The actuator of claim 2, wherein said heating component is supported adjacent said end assembly.

5. The actuator of claim 1, wherein said heating component comprises an electrically powered heating element.

6. The actuator of claim 1, wherein said SMA members are simultaneously heated to cause angular deflection of an end of each of said SMA members.

7. An actuator comprising:
    a single piece of shape memory alloy (SMA) material forming a first SMA member and an integral SMA tube arranged around said first SMA member; and
    a heating component for heating said first SMA member and said SMA tube to cause twisting of said SMA member and said SMA tube at a common end of each.

8. The actuator of claim 7, wherein said heating component is disposed adjacent a first end of each of said SMA tube and said SMA member.

9. The actuator of claim 7, wherein said heating component comprises an electrically-powered heating element.

10. The actuator of claim 7, wherein said SMA tube and said SMA member are each supported at first ends thereof end by a first end assembly.

11. The actuator of claim 10, wherein said SMA tube and said SMA member are each supported at second ends thereof by a second support structure.

12. The actuator of claim 7, wherein said SMA member and said SMA tube are simultaneously heated to cause angular deflection of one end of said actuator.

13. A method for forming an actuator, comprising:
    using a single piece of shape memory alloy (SMA) material to form a plurality of interconnected, concentric SMA elements; and
    heating said SMA elements to cause a twisting of common output ends of said SMA elements.

14. The method of claim 13, wherein heating said SMA elements comprises using an electrically-powered heating component.

15. The method of claim 13, further comprising using a thermally-conductive material placed against portions of said SMA elements to facilitate heating of said elements.

16. A mobile platform comprising:
    a shape memory alloy (SMA) actuator, said SMA actuator including:
        a single piece of SMA material forming a plurality of concentrically arranged, supported and interconnected SMA tubes;
        a heating component in thermal communication with SMA tubes for controllably heating said SMA tubes; and
        said heating causing a twisting of said SMA tubes at one end of each of said SMA tubes that generates a twisting force and a collective twisting displacement of said SMA tubes at said one end.

17. The mobile platform of claim 16, wherein said heating component comprises an electrically-powered, resistive wire type heating element.

* * * * *